(12) United States Patent
Lee et al.

(10) Patent No.: US 11,237,314 B2
(45) Date of Patent: Feb. 1, 2022

(54) DISPLAY APPARATUS, LIGHT GUIDE PLATE THEREOF AND MANUFACTURING METHOD FOR THE SAME

(71) Applicant: SAMSUNG ELECTRONICS CO., LTD., Suwon-si (KR)

(72) Inventors: Kilhong Lee, Suwon-si (KR); Youngchol Lee, Suwon-si (KR); Hyunho Lee, Suwon-si (KR); Taehee Jeon, Suwon-si (KR); Byoung-Jin Cho, Suwon-si (KR); Suk-Ju Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/994,824

(22) Filed: Aug. 17, 2020

(65) Prior Publication Data

US 2021/0088708 A1   Mar. 25, 2021

(30) Foreign Application Priority Data

Sep. 23, 2019   (KR) ........................ 10-2019-0117089

(51) Int. Cl.
  *G02F 1/1335*   (2006.01)
  *F21V 8/00*     (2006.01)
  *G02F 1/13357*  (2006.01)

(52) U.S. Cl.
  CPC ..... *G02B 6/0003* (2013.01); *G02F 1/133621* (2013.01); *G02F 1/133614* (2021.01); *G02F 2202/36* (2013.01)

(58) Field of Classification Search
  None
  See application file for complete search history.

(56) References Cited

U.S. PATENT DOCUMENTS

| | | | |
|---|---|---|---|
| 2006/0001036 A1* | 1/2006 | Jacob | G02F 1/133615 257/98 |
| 2012/0113672 A1 | 5/2012 | Dubrow et al. | |
| 2017/0199314 A1* | 7/2017 | Chen | G02B 6/0093 |
| 2017/0243916 A1* | 8/2017 | Zhu | C09K 11/08 |
| 2018/0188442 A1* | 7/2018 | Wang | G02B 6/0061 |
| 2018/0292594 A1* | 10/2018 | Lee | G02B 6/0043 |

(Continued)

FOREIGN PATENT DOCUMENTS

| | | |
|---|---|---|
| CN | 105114867 B | 8/2017 |
| CN | 105259704 B | 12/2018 |

(Continued)

OTHER PUBLICATIONS

Communication dated Dec. 11, 2020 by the European Patent office in counterpart European Patent Application No. 20193091.4.

(Continued)

*Primary Examiner* — James A Dudek
(74) *Attorney, Agent, or Firm* — Sughrue Mion, PLLC

(57) ABSTRACT

Provided is a display apparatus including: a liquid crystal panel configured to display an image; a light guide plate configured to guide light toward the liquid crystal panel; and a light source positioned adjacent to a side of the light guide plate, wherein the light guide plate includes a substrate having transparency, and a plurality of quantum dot capsules dispersed inside the substrate to change a color of light emitted from the light source.

5 Claims, 12 Drawing Sheets

(56) References Cited

U.S. PATENT DOCUMENTS

2018/0340674 A1   11/2018  Koole et al.
2019/0025646 A1*  1/2019  Han .................... G02B 6/0043
2020/0095265 A1*  3/2020  Lee ...................... C07F 7/0812
2020/0373467 A1* 11/2020  Zhong .................... H01L 33/56

FOREIGN PATENT DOCUMENTS

| CN | 109991698 A | 7/2019 |
|---|---|---|
| EP | 2 700 998 A1 | 2/2014 |
| JP | 2017-110061 A | 6/2017 |
| KR | 1020180130765 A | 12/2018 |
| WO | 2019/007296 A1 | 1/2019 |

OTHER PUBLICATIONS

Communication dated Jul. 9, 2021 by the European Patent Office in counterpart European Patent Application No. 20193091.4.

* cited by examiner

DISPLAY APPARATUS, LIGHT GUIDE PLATE THEREOF AND MANUFACTURING METHOD FOR THE SAME

CROSS-REFERENCE TO RELATED APPLICATION

This application is based on and claims priority under 35 U.S.C. § 119 to Korean Patent Application No. 10-2019-0117089, filed on Sep. 23, 2019 in the Korean Intellectual Property Office, the disclosure of which is incorporated by reference herein in its entirety.

BACKGROUND

1. Field

The disclosure relates to a light guide plate and a liquid crystal display apparatus including the same, and more particularly, to a light guide plate containing quantum dot capsules and a liquid crystal display apparatus including the light guide plate containing quantum dot capsules.

2. Description of the Related Art

A display apparatus is an output apparatus that visually displays images and data information, such as characters, figures, etc. Examples of the display apparatus include a television, various monitors, and various portable terminals (for example, a notebook, a tablet personal computer (PC), and a smart phone).

Display apparatuses are classified into an emissive type such as organic light emitting diodes (OLEDs) using a self-emissive display panel that itself emits light, and a non-emissive type such as a liquid crystal display (LCD) that receives light from a backlight unit to emit light.

Backlight units are classified according to positions of light sources, and may be classified into a direct type in which light sources are positioned behind a display panel and an edge type in which light sources are positioned at the sides of a display panel. The edge type in which light sources are positioned at the sides of a display panel includes a light guide plate for guiding light emitted from the light sources toward the display panel.

Recently, research has been conducted to improve color reproduction of a display apparatus by using quantum dots. Quantum dots represent nanometer-sized semiconductor crystals produced through chemical synthesis processes. Quantum dots of smaller particles generate light of shorter wavelengths, and quantum dots of larger particles generate light of longer wavelengths.

Methods that use quantum dots for a display apparatus include a quantum dot rail method of using a quantum dot rail resulting from placing quantum dots into a glass tube and then sealing the glass tube, an on-chip method of installing quantum dots directly in an encapsulation layer of a blue LED, a photoresist method of using quantum dots as color filters, a method of using a quantum dot sheet obtained by positioning a quantum dot resin between barrier films, etc. Lately, quantum dot sheets are widely used.

The barrier films of the quantum dot sheet are used to protect the quantum dot resin that is vulnerable to heat and water. However, using the barrier films increases the costs for producing and managing the quantum dot sheet and may cause optical loss.

SUMMARY

One or more embodiments provide a display apparatus that may achieve high brightness and high color reproduction by using a light-emitting function of quantum dots without using a quantum dot sheet.

One or more embodiments provide a display apparatus that may reduce production and management costs through integration of optical members.

One or more embodiments provide a display apparatus including a light guide plate, of which a pattern formation process may be omitted because a reflection pattern of the light guide plate is not needed.

Additional aspects of the disclosure will be set forth in part in the description which follows and, in part, will be obvious from the description, or may be learned by practice of the disclosure.

According to an aspect of an example embodiment, provided is a display apparatus including: a liquid crystal panel configured to display an image; a light guide plate configured to guide light toward the liquid crystal panel; and a light source positioned adjacent to a side of the light guide plate, wherein the light guide plate includes a plurality of quantum dot capsules dispersed inside the light guide plate, the plurality of quantum dot capsules configured to change a color of light emitted from the light source.

Each of the plurality of quantum dot capsules may include: a quantum dot resin including a plurality of quantum dots; and a protection layer coated on a surface of the quantum dot resin.

The protection layer may include a polystyrene (PS) material.

The light guide plate may further include a substrate having transparency in which the plurality of quantum dot capsules are dispersed, and the substrate may include a poly methyl methacrylate (PMMA) material.

The quantum dot resin may include a first quantum dot configured to emit red light and a second quantum dot configured to emit green light.

The light source may include a blue light emitting diode (LED).

The light guide plate may include a first surface, which faces the light source and to which the light emitted from the light source is incident, and a second surface being opposite to the first surface, and a number of the plurality of quantum dot capsules per a unit volume may be greater at a position toward the second surface than at a position toward the first surface.

The light source may include a first light source positioned adjacent to a first side of the light guide plate and a second light source positioned adjacent to a second side of the light guide plate, the second side being opposite to the first side; the light guide plate may include a first surface, which faces the first light source and to which light emitted from the first light source is incident, and a second surface which faces the second light source and to which light emitted from the second light source is incident; and a number of the plurality of quantum dot capsules per a unit volume may be greater at a position toward a center portion of the light guide plate than at a position toward the first surface or the second surface.

The light guide plate may include a first surface which faces the liquid crystal panel and through which light, which is incident from the light source, exits from the light guide plate, and a second surface being flat and opposite to the first surface.

The light guide plate may further include a substrate having transparency in which the plurality of quantum dot capsules are dispersed, and the light guide plate may be formed by injecting the plurality of quantum dot capsules into a molten solution of the substrate that is extruded.

According to an aspect of an example embodiment, provided is a light guide plate for a display apparatus, the light guide plate including: a substrate having transparency; and a plurality of quantum dot capsules dispersed inside the substrate and configured to change a color of light emitted from a light source.

Each of the plurality of quantum dot capsules may include: a quantum dot resin including a plurality of quantum dots; and a protection layer coated on a surface of the quantum dot resin.

The protection layer may include a polystyrene (PS) material.

The light guide plate may include a first surface to which the light emitted from the light source is incident, and a second surface opposite to the first surface, and a number of the plurality of quantum dot capsules per a unit volume may be greater at a position toward the second surface than at a position toward the first surface.

The light guide plate may include a first surface to which light emitted from a first light source is incident, and a second surface to which light emitted from a second light source is incident, the second surface being opposite to the first surface; and a number of the plurality of quantum dot capsules per a unit volume may be greater at a position toward a center portion of the light guide plate than at a position toward the first surface and the second surface.

The light guide plate may further include a first surface through which light, which is incident from the light source, exits from the light guide plate, and a second surface being flat and opposite to the first surface.

According to an aspect of an example embodiment, provided is a method for manufacturing a light guide plate for a display apparatus, the method including: melting powder for a substrate having transparency to provide a molten solution; coating a protection layer on a surface of a quantum dot resin to form a quantum dot capsule, the quantum dot resin including a plurality of quantum dots; and extruding the molten solution and injecting a plurality of quantum dot capsules into the molten solution.

The light guide plate may include a first surface to which light emitted from a light source is incident, and a second surface being opposite to the first surface, the method further including injecting the plurality of quantum dot capsules into the molten solution such that a number of the plurality of quantum dot capsules per a unit volume is greater at a position toward the second surface than at a position toward the first surface.

The light guide plate may include a first surface to which light emitted from a first light source is incident, and a second surface to which light emitted from a second light source is incident, the second surface being opposite to the first surface, the method further including injecting the plurality of quantum dot capsules into the molten solution such that a number of the plurality of quantum dot capsules per a unit volume is greater at a position toward a center portion of the light guide plate than at a position toward the first surface and the second surface.

The injecting may include injecting the plurality of quantum dot capsules via a plurality of spray holes, respectively, the method further including controlling at least one of an interval between the plurality of spray holes and a speed at which the plurality of quantum dot capsules are injected.

BRIEF DESCRIPTION OF THE DRAWINGS

The above and/or other aspects of the disclosure will become apparent and more readily appreciated from the following description of certain embodiments, taken in conjunction with the accompanying drawings of which.

DETAILED DESCRIPTION

Figure 1:
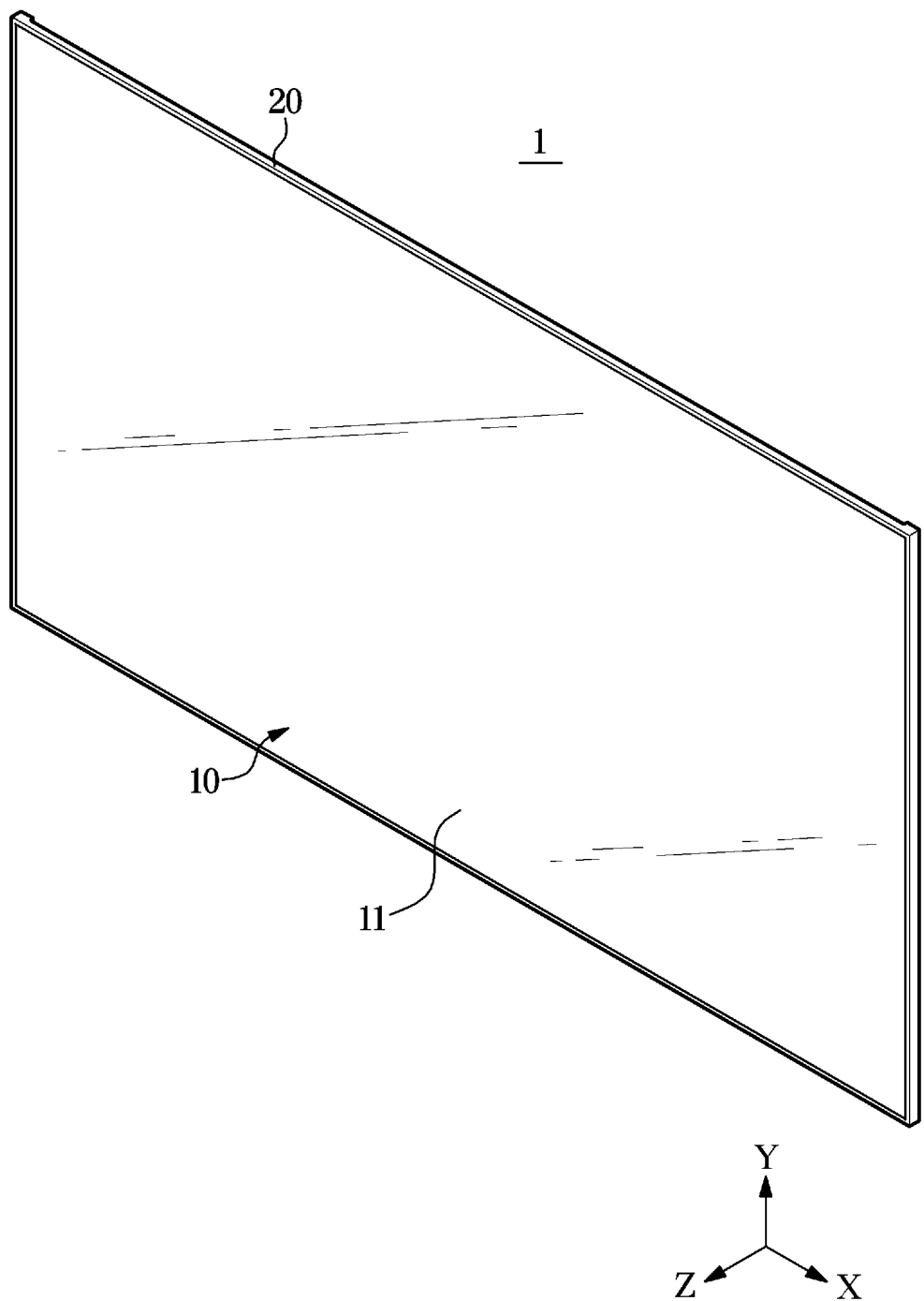
FIG. 1 shows an outer appearance of a display apparatus according to an embodiment of the disclosure.

Embodiments described in the specification are only example embodiments of the disclosure, and thus it should be understood that various equivalents or modified example embodiments may replace those described herein, are included in the scope of the disclosure.

It is to be understood that the terms of a singular form such as "a," "an," and "the" may include plural referents unless the context clearly dictates otherwise. In the drawings, for easy understanding, the shapes, sizes, etc. of components may be more or less exaggeratedly shown.

It will be understood that when the terms "includes," "comprises," "including," and/or "comprising," when used in this specification, specify the presence of stated features, figures, steps, operations, components, members, or combinations thereof, but do not preclude the presence or addition of one or more other features, figures, steps, operations, components, members, or combinations thereof.

It will be further understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Furthermore, line connections or connection members between elements depicted in the drawings represent functional connections and/or physical or circuit connections by way of example, and in actual applications, they may be replaced or embodied with various additional functional connections, physical connections, or circuit connections.

Operations of a method may be performed in an appropriate order unless explicitly described in terms of order or described to the contrary, and are not limited to the stated order thereof. Also, a person skilled in the art should understand that elements described in the embodiments may be optional and thus may be omitted or replaced.

Directions of "front", "rear", "up", "down", "left", and "right" are defined based on directions shown in FIG. 1 throughout the specification. In FIG. 1, X-axis, Y-axis, and Z-axis directions that are perpendicular to each other are shown, wherein the X-axis direction represents a left-right direction of the display apparatus, the Y-axis direction represents an up-down direction of the display apparatus, and the Z-axis direction represents a front-rear direction of the display apparatus.

Throughout the disclosure, the expression "at least one of a, b or c" indicates only a, only b, only c, both a and b, both a and c, both b and c, all of a, b, and c, or variations thereof.

Hereinafter, the embodiments of the disclosure will be described in detail with reference to the accompanying drawings.

Figure 2:
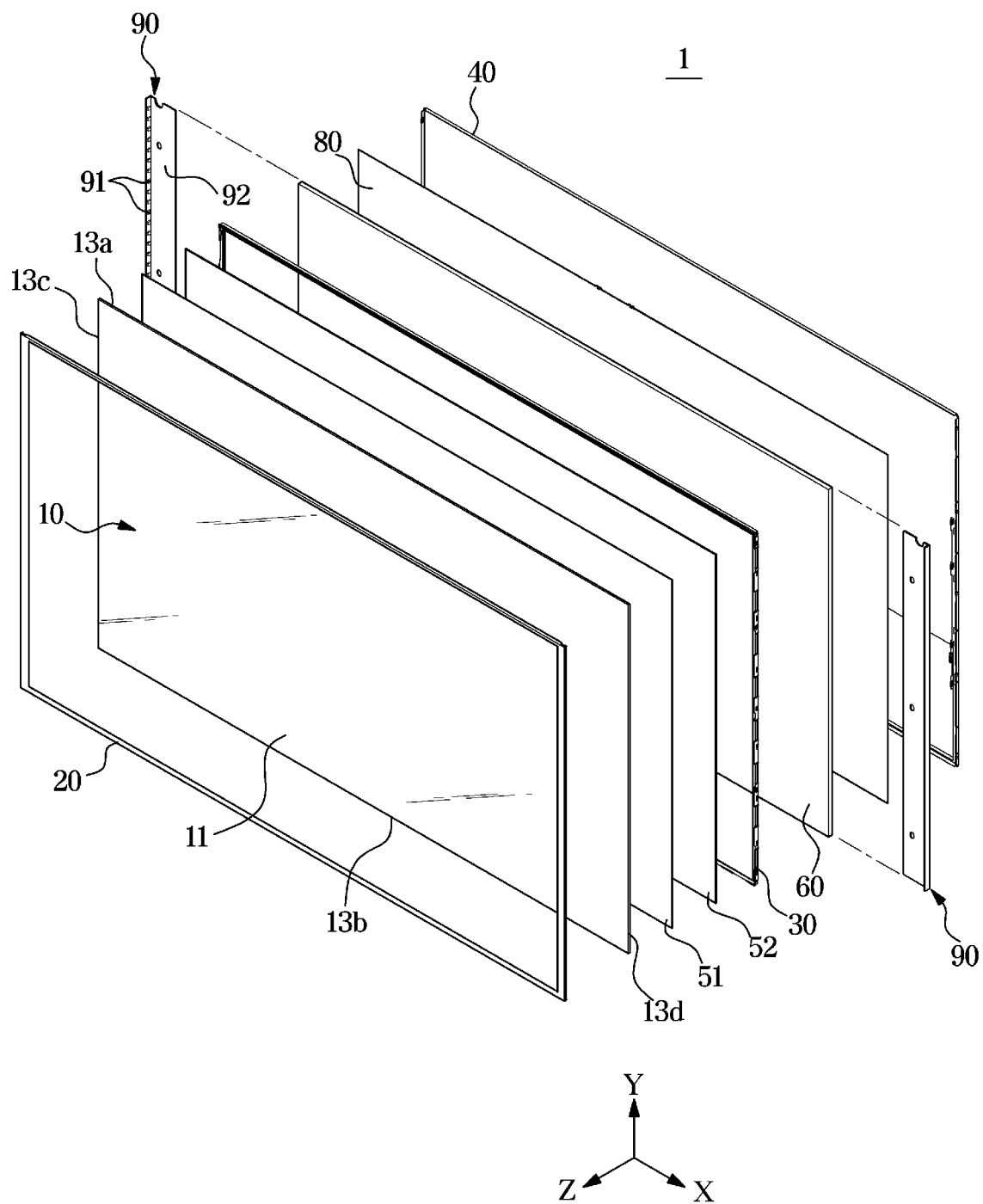
FIG. 2 is an exploded perspective view showing main components of the display apparatus of FIG. 1.
Figure 3:
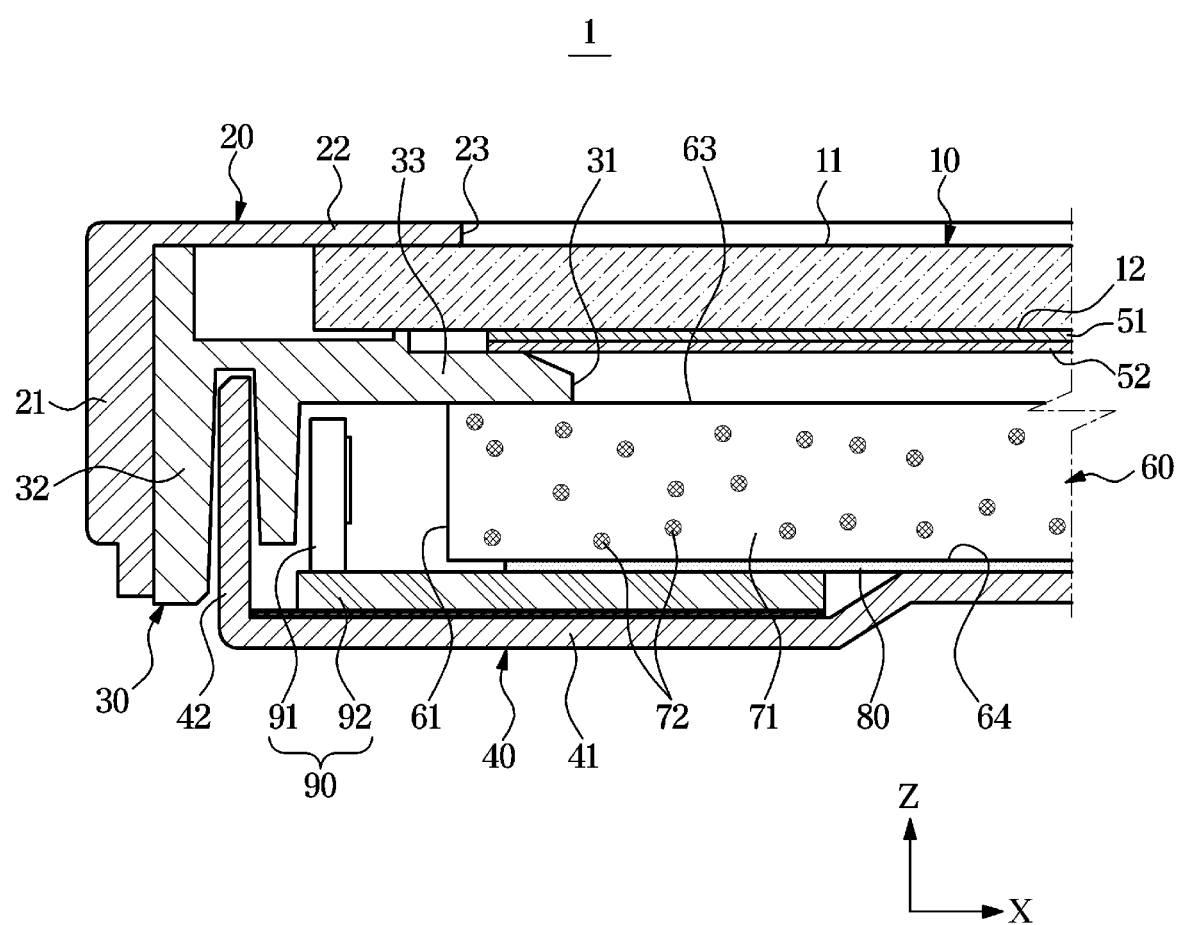
FIG. 3 is a side cross-sectional view of the display apparatus of FIG. 1.
Figure 4:
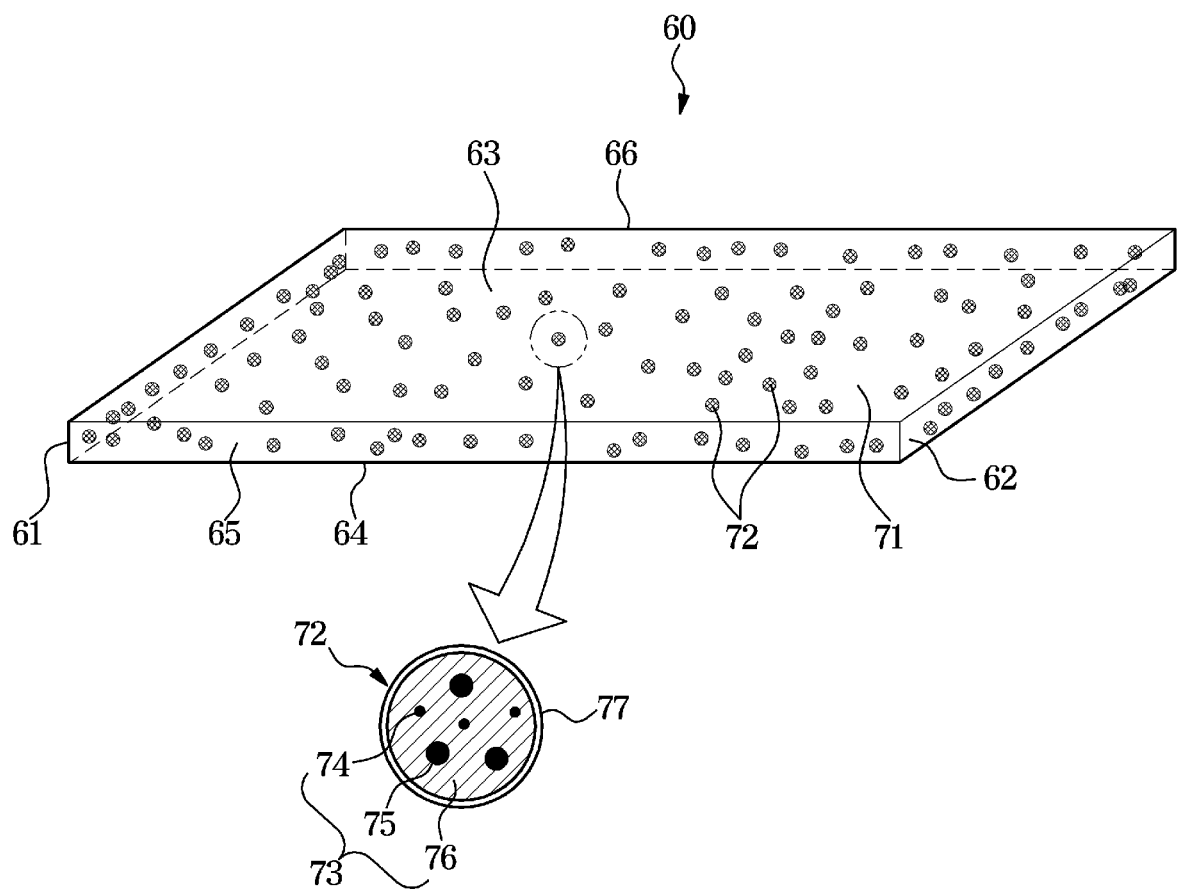
FIG. 4 shows a light guide plate of the display apparatus of FIG. 1.
Figure 5:
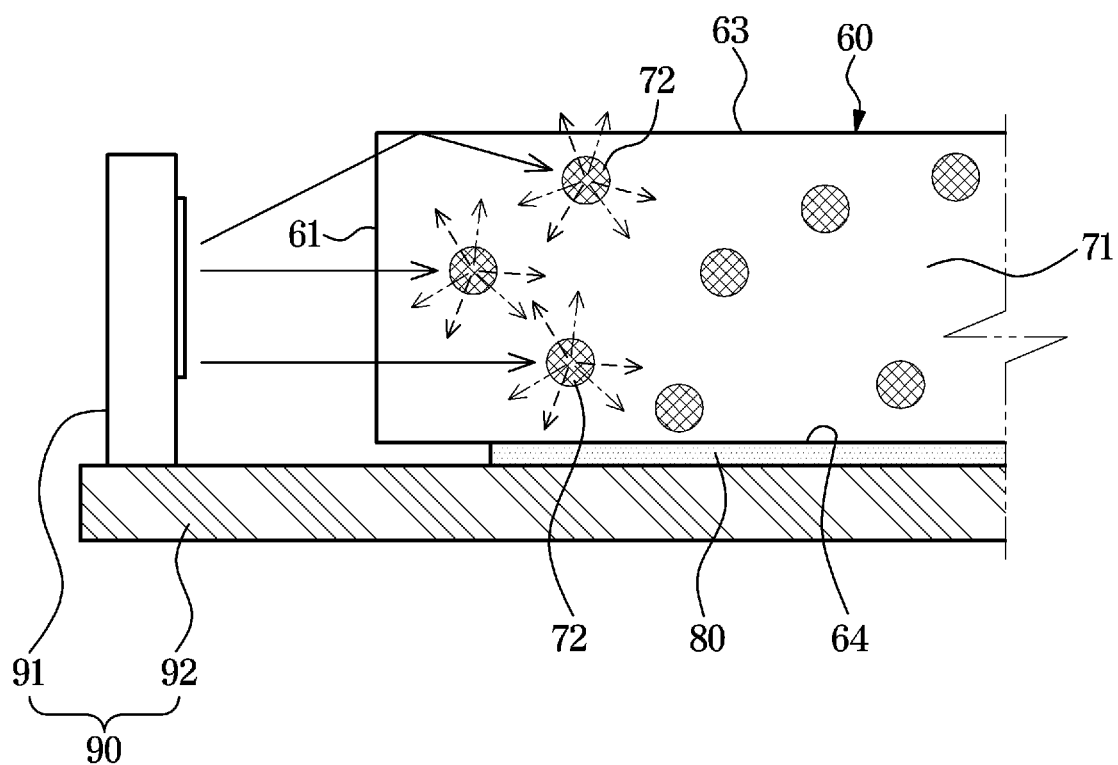
FIG. 5 is a view for describing a function in which quantum dot capsules of the display apparatus of FIG. 1 scatter light.

FIG. 1 shows an outer appearance of a display apparatus according to an embodiment of the disclosure. FIG. 2 is an exploded perspective view showing main components of the display apparatus of FIG. 1. FIG. 3 is a side cross-sectional view of the display apparatus of FIG. 1. FIG. 4 shows a light guide plate of the display apparatus of FIG. 1. FIG. 5 is a view for describing a function in which quantum dot capsules of the display apparatus of FIG. 1 scatter light.

Hereinafter, a display apparatus according to an embodiment of the disclosure will be described with reference to FIGS. 1 to 5.

A display apparatus 1 may include a liquid crystal panel 10 for displaying images, a backlight unit positioned behind the liquid crystal panel 10 to provide light to the liquid crystal panel 10, and a chassis assembly supporting the backlight unit and the liquid crystal panel 10.

The chassis assembly may include a rear chassis 40 supporting the backlight unit, a front chassis 20 positioned in front of the rear chassis 40 and supporting the liquid crystal panel 10, and a middle mold 30 coupled between the front chassis 20 and the rear chassis 40.

The liquid crystal panel 10 may include a thin film transistor substrate on which thin film transistors are arranged in a matrix form, a color filter substrate coupled to the thin film transistor substrate in such a way to be parallel to the thin film transistor substrate, and liquid crystal injected between the thin film transistor substrate and the color filter substrate, wherein optical properties of the liquid crystal change according to a change of a voltage or temperature.

The liquid crystal panel 10 may include a front surface 11 on which images are displayed, a rear surface 12 being opposite to the front surface 11, and four sides that include an upper side 13a, a lower side 13b, a left side 13c, and a right side 13d.

The backlight unit may be positioned behind the liquid crystal panel 10 to irradiate light toward the liquid crystal panel 10. The backlight unit may include a light source module 90 including a light source 91 and a substrate 92 on which the light source 91 is mounted, and a plurality of optical members positioned on a moving path of light emitted from the light source 91.

The light source module 90 may be positioned to correspond to at least one side of the liquid crystal panel 10. More specifically, as shown in FIG. 2, the light source module 90 may be positioned to correspond to the left and the right sides 13c and 13d of the liquid crystal panel 10. However, the number and position of the light source module 90 are not limited to the embodiment shown in FIG. 2. That is, unlike the embodiment of FIG. 2, the light source module 90 may be positioned to correspond to the upper and the lower sides 13a and 13b of the liquid crystal panel 10, the four sides 13a, 13b, 13c, and 13d of the liquid crystal panel 10, or any one or more of the four sides 13a, 13b, 13c, and 13d.

A plurality of light sources 91 may be mounted in a line on the substrate 92. On the substrate 92, a driving power line may be formed to supply driving power to the light sources 91, and the driving power line may be connected to a signal cable (not shown) and a backlight unit driving circuit (not shown).

The light source 91 may be, for example, a blue light emitting diode (LED). However, the light source 91 is not limited thereto, and may be of any other type such as a cold cathode fluorescent lamp (CCFL) or an external electrode fluorescent lamp (EEFL).

The optical members may be positioned on a moving path of light emitted from the light source 91 to guide a traveling direction of the light or improve optical properties. The optical members may include a light guide plate 60 for guiding light emitted from the light source 91 toward the liquid crystal panel 10, a reflector plate 80 for reflecting light emitted from the light source 91 or light traveling backward from the light guide plate 60, and a plurality of optical sheets 51 and 52 for improving optical properties such as brightness.

The optical sheets 51 and 52 may be positioned in front of the light guide plate 60 to improve the optical properties of light exiting the light guide plate 60. The optical sheets 51 and 52 may include a prism sheet for focusing light to improve brightness, a protection sheet for protecting the other optical sheets from an external impact or foreign materials, a Dual Brightness Enhancement Film (DBEF) for transmitting preset polarized light (e.g., light in a preset polarization direction) and reflecting light other than the preset polarized light (e.g., light that is not in the preset polarization direction) to improve brightness, etc.

The rear chassis 40 may be positioned behind the backlight unit. The rear chassis 40 may have a plate shape of which edges are bent toward a front direction of the display apparatus 1. The backlight unit may be accommodated between the rear chassis 40 and the front chassis 20.

The rear chassis 40 may include a rear base 41 on which the light source module 90 is mounted, and a rear side portion 42 formed at one or more of an upper edge, a lower edge, a left edge, and a right edge of the rear chassis 40 to be coupled to the middle mold 30.

The rear chassis 40 may function to radiate heat generated from devices such as the light source 91 to an outside. To radiate heat, the rear chassis 40 may include various metal materials, such as aluminum and SUS, or a plastic material such as ABS.

The front chassis 20 may be in a shape of a frame having an opening 23 to expose the front surface 11 of the liquid crystal panel 10. The front chassis 20 may include a front side portion 21 formed in one or more of an upper edge, a lower edge, a left edge, and a right edge of the front chassis 20 to be coupled to the middle mold 30, and a panel support portion 22 protruding from the front side portion 21 inwardly of the display apparatus 1 to support the liquid crystal panel 10.

The middle mold 30 may support the liquid crystal panel 10, the light guide plate 60, and the optical sheets 51 and 52, and maintain a space between the light guide plate 60 and the optical sheets 51 and 52. The middle mold 30 may be coupled between the front chassis 20 and the rear chassis 40.

The middle mold 30 may be in a shape of a frame having an opening 31 through which light exiting the light guide plate 60 passes. The middle mold 30 may include a frame portion 32 to which the front chassis 20 and the rear chassis 40 are coupled, and a center protrusion 33 protruding from the frame portion 32 inwardly of the display apparatus 1. The center protrusion 33 may support the liquid crystal panel 10, the light guide plate 60, and the optical sheets 51 and 52.

The frame portion 32 may be formed at one or more of an upper edge, a lower edge, a left edge, and a right edge of the middle mold 30. The frame portion 32 may be coupled to the front chassis 20 and the rear chassis 40 through various structures and coupling members for insertion and/or combination that is known in the art.

The light guide plate 60 according to an embodiment of the disclosure may function to improve color reproduction, in addition to a function of guiding light emitted from the light source 91 toward the liquid crystal panel 10. The light source 91 may be positioned at a side of the light guide plate 60. The light source 91 may face a side surface of the light guide plate 60. The light source 91 may be spaced a predetermined distance from the side surface of the light guide plate 60.

As shown in FIG. 4, the light guide plate 60 may have a shape of a hexahedron. The light guide plate 60 may have a first incident surface 61, a second incident surface 62 being opposite to the first incident surface 61, an exit surface 63 through which light exits, a reflection surface 64 being opposite to the exit surface 63, a first side surface 65, and a second side surface 66. However, this is merely an example and the light guide plate 60 is not limited to this example. For example, unlike the embodiment of FIG. 4, the light guide plate 60 may be a wedge type, wherein one end to which light is incident is thick and the opposite end is thin.

The light guide plate 60 may include a substrate 71 having transparency, and a plurality of quantum dot capsules 72 dispersed inside the substrate 71 to change a color of light emitted from the light source 91.

The substrate 71 may be a poly methyl methacrylate (PMMA) material or a poly carbonate (PC) material.

Each quantum dot capsule 72 may include a quantum dot resin 73 being a mixture of a plurality of quantum dots 74 and 75 and a cured material 76, and a protection layer 77 coated on a surface of the quantum dot resin 73 to surround the quantum dot resin 73.

The protection layer 77 may include a polystyrene (PS) material to protect the quantum dot resin 73 that is vulnerable to heat and water.

The quantum dots 74 and 75 may be nanometer-sized semiconductor crystals emitting light. The quantum dots 74 and 75 may receive blue light and generate all colors of visible light according to magnitudes of the received blue light. Quantum dots having smaller sizes may generate light of shorter wavelengths and quantum dots having greater sizes may generate light of longer wavelengths. The quantum dots 74 and 75 may include a first quantum dot 74 configured to emit red light and a second quantum dot 75 configured to emit green light.

Based on the above-described configuration, as shown in FIG. 5, light entered the inside of the light guide plate 60 through the incident surface 61 may be reflected, refracted, and/or scattered by the quantum dot capsules 72 dispersed inside the light guide plate 60. A first part of the light reflected, refracted and/or scattered by the quantum dot capsules 72 may be emitted toward the liquid crystal panel 10 through the exit surface 63 of the light guide plate 60. The second part of the light reflected, refracted and/or scattered by the quantum dot capsules 72 may be emitted in a rear direction from the light guide plate 60 through the reflection surface 64 of the light guide plate 60, and the light emitted in the rear direction from the light guide plate 60 may be reflected by the reflector plate 80 and thus again incident to the inside of the light guide plate 60.

As such, the quantum dot capsules 72 may substitute a reflection pattern that is formed on a rear surface of a general light guide plate, and accordingly, the reflection surface 64 of the light guide plate 60 according to an embodiment of the disclosure may require no pattern for reflecting light. That is, the reflection surface 64 of the light guide plate 60 according to an embodiment of the disclosure may be flat without any pattern.

To provide uniform brightness over the entire light guide plate 60, the quantum dot capsules 72 of the light guide plate 60 may need to be spaced at appropriate intervals, which will be described later.

Figure 6:
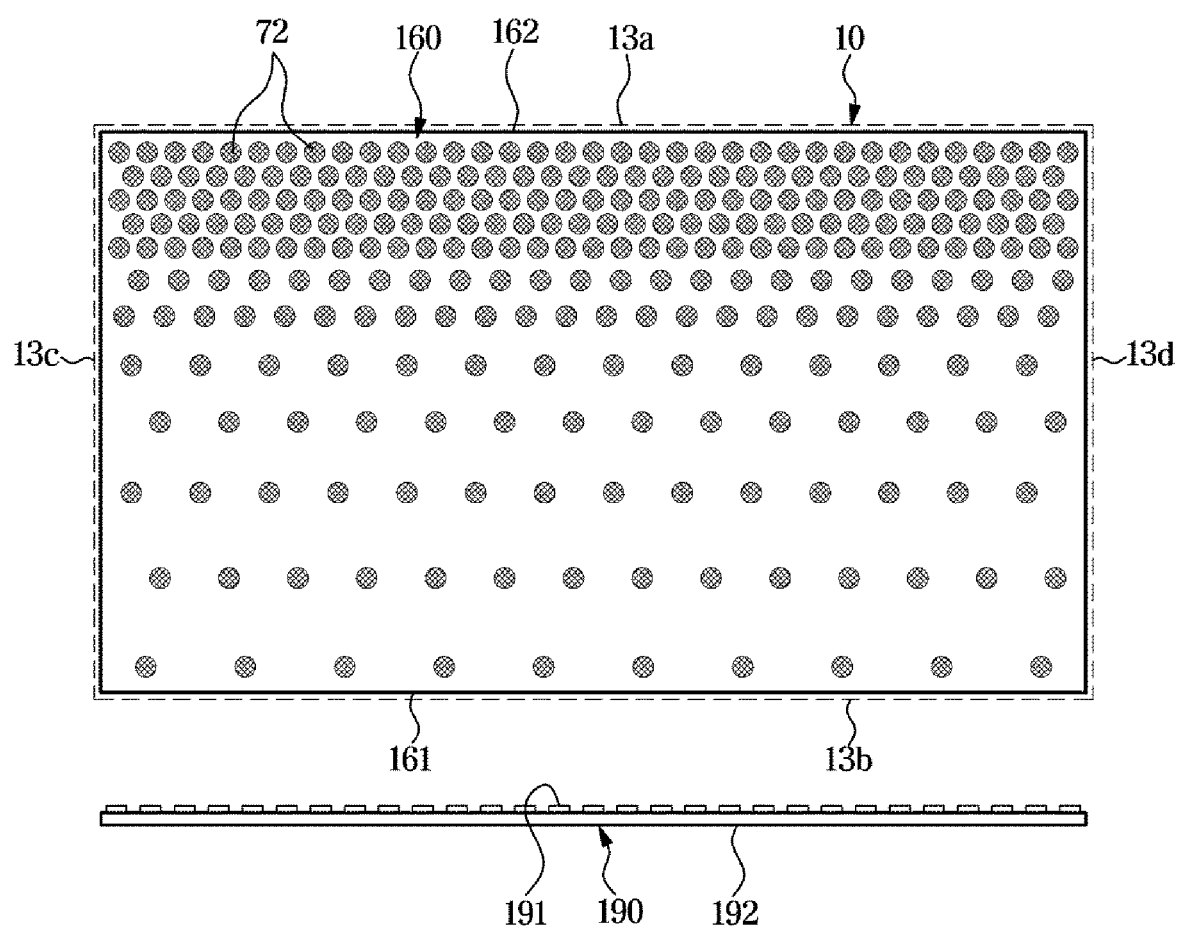
FIG. 6 shows an arrangement of quantum dot capsules of a light guide plate according to another embodiment of the disclosure.
Figure 7:
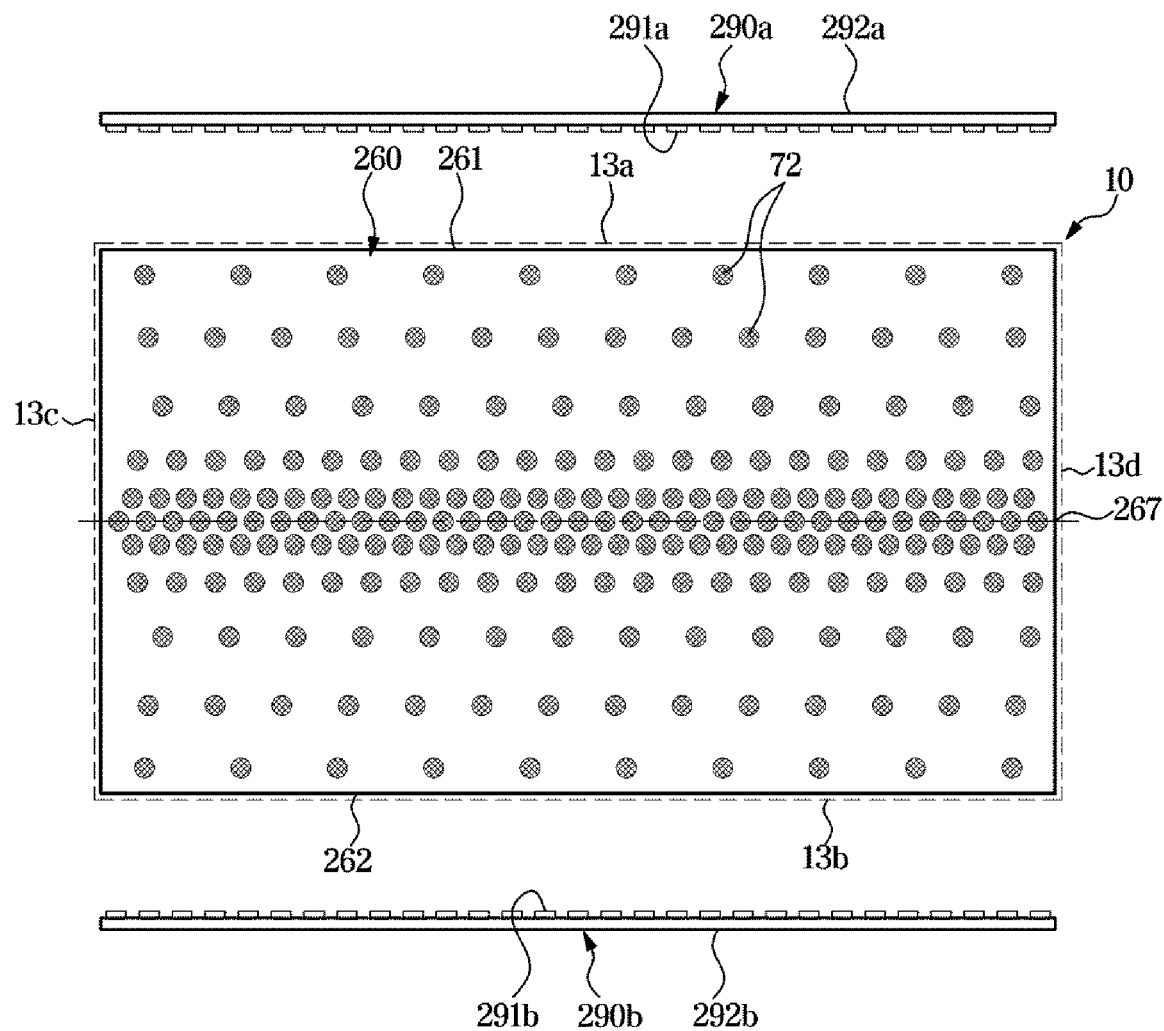
FIG. 7 shows an arrangement of quantum dot capsules of a light guide plate according to another embodiment of the disclosure.

FIG. 6 shows an arrangement of quantum dot capsules of a light guide plate according to another embodiment of the disclosure. FIG. 7 shows an arrangement of quantum dot capsules of a light guide plate according to another embodiment of the disclosure.

Referring to FIGS. 6 and 7, an arrangement of the quantum dot capsules 72 for providing uniform brightness of the light guide plate 60 will be described.

Because an amount of light is lowered at a longer distance from light sources 191, 291a, and 291b, a greater number of the quantum dot capsules 72 per a unit volume may be arranged at a longer distance from the light sources 191, 291a, and 291b to equalize an amount of light exiting the light guide plate 60 by compensating for an insufficient amount of light.

More specifically, as shown in FIG. 6, when a light source module 190 having a light source 191 and a substrate 192 is positioned to correspond to a side surface 13d of the four side surfaces 13a, 13b, 13c, and 13d of the liquid crystal panel 10, the light guide plate 60 may include an incident surface 161 which faces the light source 191 and to which light emitted from the light source 191 is incident, and an opposite surface 162 being opposite to the incident surface 161, wherein a number of the quantum dot capsules 72 per a unit volume may increase toward the opposite surface 162 from the incident surface 161. For example, the number of the quantum dot capsules 72 per a unit volume may be greatest at a position closest to the opposite surface 162 and smallest at a position closest to the incident surface 161.

As shown in FIG. 7, when a first light source module 290a having a first light source 291a and a first substrate 292a is positioned to correspond to the side surface 13a of the four side surfaces 13a, 13b, 13c, and 13d of the liquid crystal panel 10, and a second light source module 290b having a second light source 291b and a second substrate 292b is positioned to correspond to the opposite side surface 13b of the liquid crystal panel 10, the light guide plate 260 may include a first incident surface 261 which faces the first light source 291a and to which light emitted from the first light source 291a is incident, and a second incident surface 262 which faces the second light source 291b and to which light emitted from the second light source 291b is incident, wherein a number of the quantum dot capsules 72 per a unit volume may increase toward a center of the light guide plate 260 from the first incident surface 261 and the second incident surface 262.

Based on the above-described configuration, uniform brightness may be provided over the entire light guide plate 260.

Figure 8:
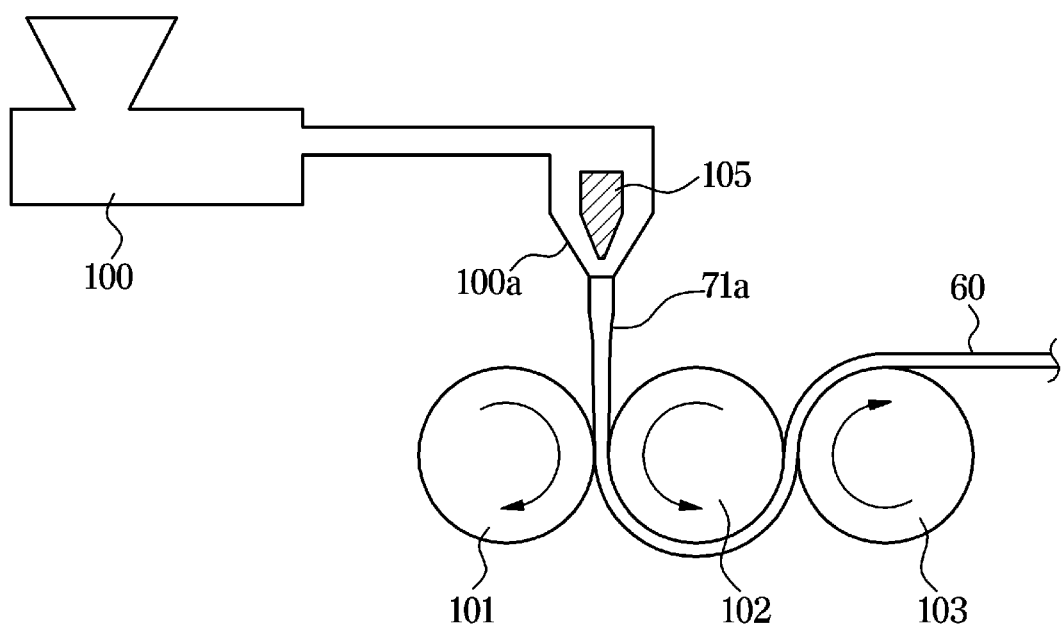
FIG. 8 is a view for describing a method for manufacturing a light guide plate according to an embodiment of the disclosure.
Figure 9:
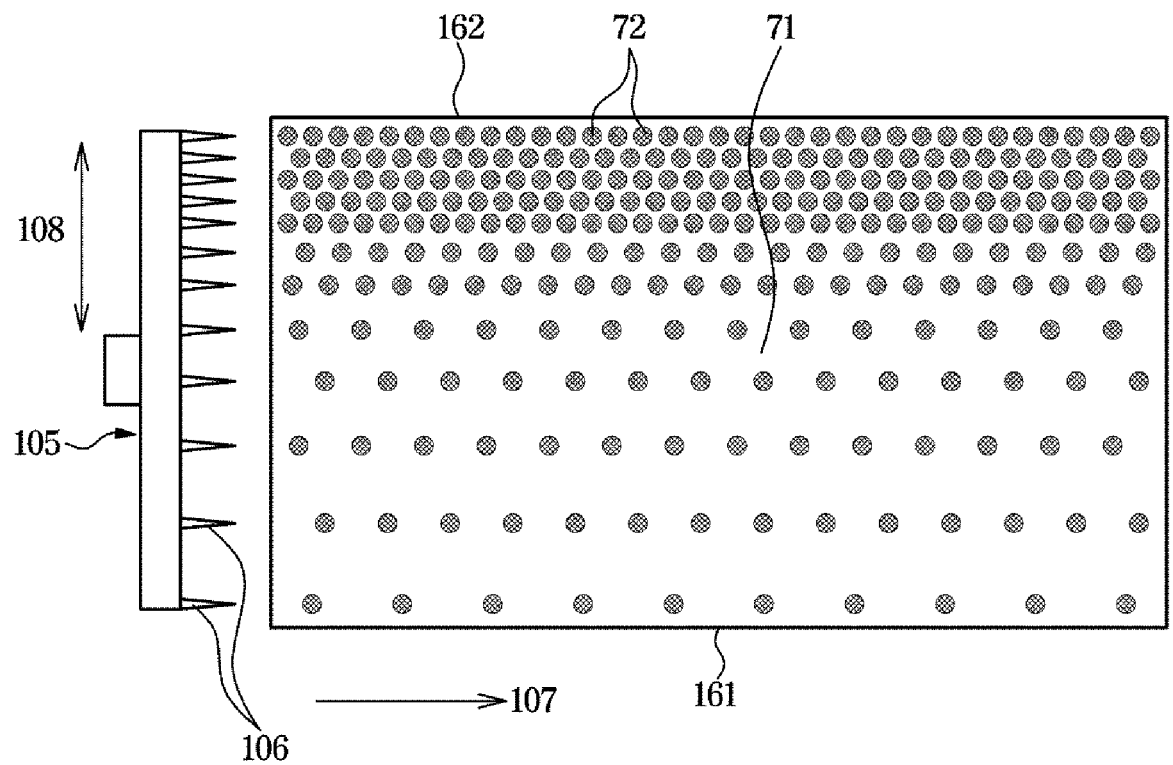
FIG. 9 is a view for describing a method for manufacturing the light guide plate shown in FIG. 6, according to an embodiment of the disclosure.
Figure 10:
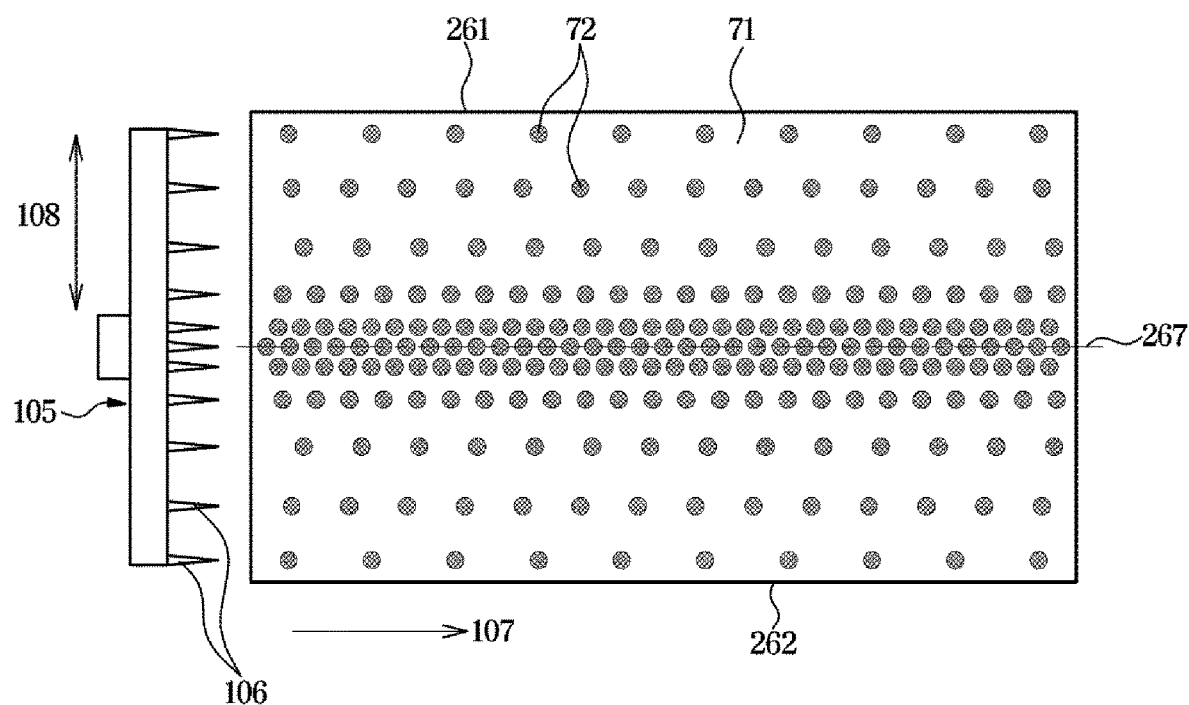
FIG. 10 is a view for describing a method for manufacturing the light guide plate shown in FIG. 7, according to an embodiment of the disclosure.

FIG. 8 is a view for describing a method for manufacturing a light guide plate according to an embodiment of the disclosure. FIG. 9 is a view for describing a method for manufacturing the light guide plate shown in FIG. 6, according to an embodiment of the disclosure. FIG. 10 is a view for describing a method for manufacturing the light guide plate shown in FIG. 7, according to an embodiment of the disclosure.

A method for manufacturing a light guide plate according to an embodiment of the disclosure will be described with reference to FIGS. 8 to 10.

The light guide plate 60 may be manufactured by extruding a molten solution 71a of the substrate 71. The molten solution 71a may be obtained by melting powder for the substrate 71 (e.g., powder that constitutes the substrate 71). The quantum dot capsules 72 may be injected into the molten solution 71a of the substrate 71 when the molten solution 71a of the substrate 71 is extruded.

As shown in FIG. 8, an extruder for extruding and manufacturing the light guide plate 60 may include a supplier 100 for providing the molten solution 71a of the substrate 71, a plurality of rollers 101, 102, and 103, and a nozzle 105 for injecting the quantum dot capsules 72 into the molten solution 71a of the substrate 71.

The nozzle 105 may be positioned at an exit 100a of the supplier 100. The nozzle 105 may include a plurality of spray holes 106 that are arranged and spaced along a direction 108 that is perpendicular to an extruding direction 107. The quantum dot capsules 72 may be sprayed from each spray hole 106 and injected into the molten solution 71a of the substrate 71.

The rollers 101, 102, and 103 may include a first roller 101, a second roller 102, and a third roller 103. The first roller 101 may be engaged with the second roller 102 to extrude the substrate 71 in a molten state. The third roller 103 may be engaged with the second roller 102 to change a moving direction of the extruded substrate 71.

To cause the entire light guide plate 60 to have uniform brightness, it may be needed to adjust intervals between the quantum dot capsules 72, as described above, and to adjust the intervals between the quantum dot capsules 72, injection of the quantum dot capsules 72 may be appropriately controlled through the nozzle 105.

For example, to cause a number of the quantum dot capsules 72 per a unit volume to increase toward the opposite surface 162 from the incident surface 161 as shown in FIG. 6 or to cause a number of the quantum dot capsules 72 per a unit volume to increase toward the center of the light guide plate 260 from the first incident surface 261 and the second incident surface 262 as shown in FIG. 7, injection of the quantum dot capsules 72 may be appropriately controlled through the nozzle 105.

More specifically, the intervals between the spray holes 106 of the nozzle 105 may be adjusted, and/or speed at which the quantum dot capsules 72 are sprayed through the individual spray holes 106 may be adjusted to increase the number of the quantum dot capsules 72 per a unit volume.

That is, to adjust the number of the quantum dot capsules 72 per a unit volume in the embodiment of FIG. 6, the spray holes 106 may be arranged at shorter intervals at positions toward the opposite surface 162 of the light guide plate 60 than at positions toward the incident surface 161 of the light guide plate 60, and the spray holes 106 located closer to the opposite surface 162 may spray the quantum dot capsules 72 at higher speed than those located closer to the incident surface 161, so that a number of the quantum dot capsules 72 per a unit volume increases toward the opposite surface 162 from the incident surface 161.

Also, to adjust the number of the quantum dot capsules 72 per a unit volume in the embodiment of FIG. 7, the spray holes 106 may be arranged at shorter intervals at positions toward the center 267 of the light guide plate 260 than at positions toward the first incident surface 261 and the second incident surface 262, and the spray holes 106 located closer to the center 267 of the light guide plate 260 may spray the quantum dot capsules 72 at higher speed than those located closer to the first incident surface 261 and the second incident surface 262, so that a number of the quantum dot capsules 72 per a unit volume increases toward the center 267 of the light guide plate 260 from the first incident surface 261 and the second incident surface 262.

Figure 11:
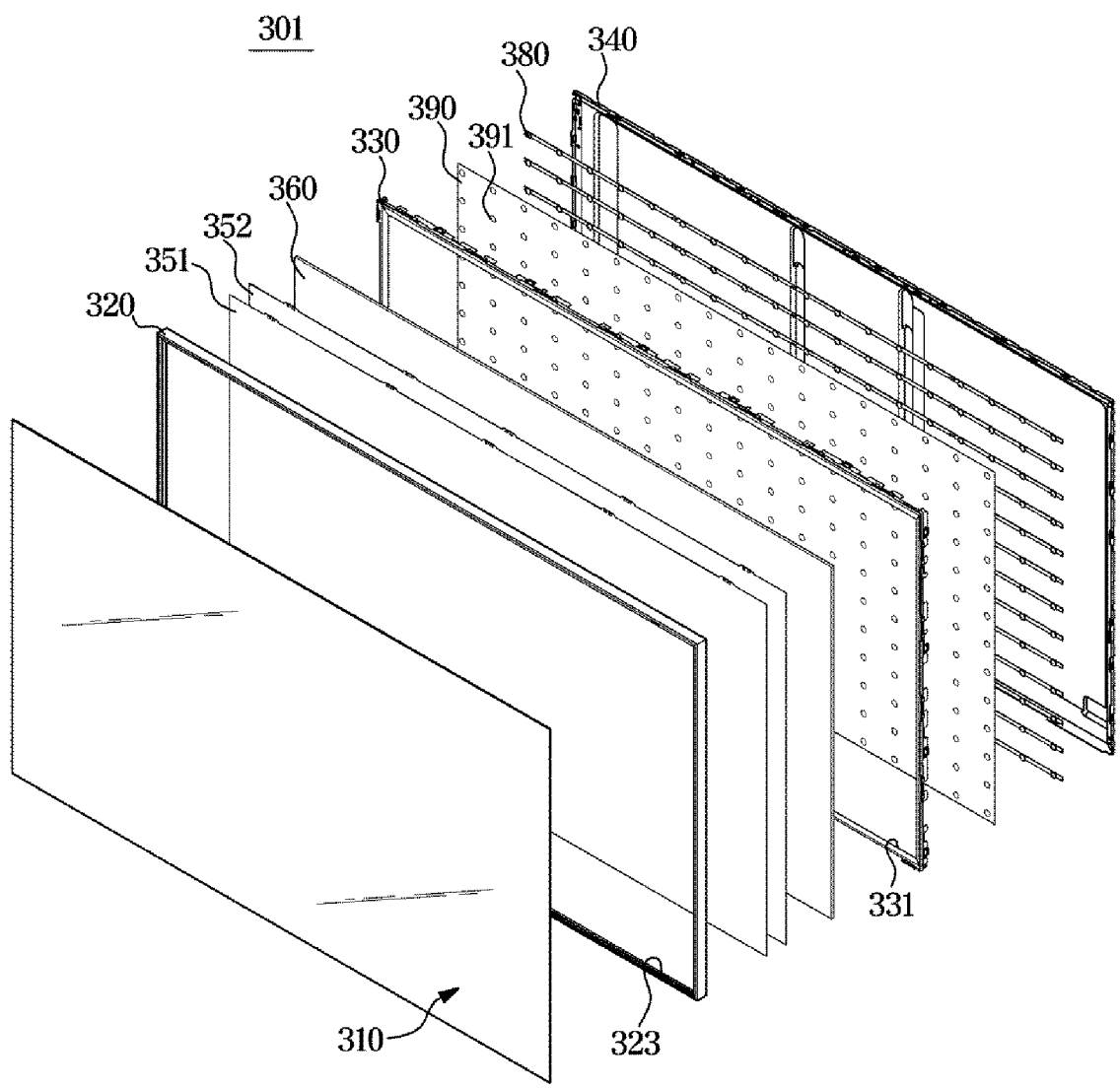
FIG. 11 is an exploded perspective view showing main components of a display apparatus according to another embodiment of the disclosure.
Figure 12:
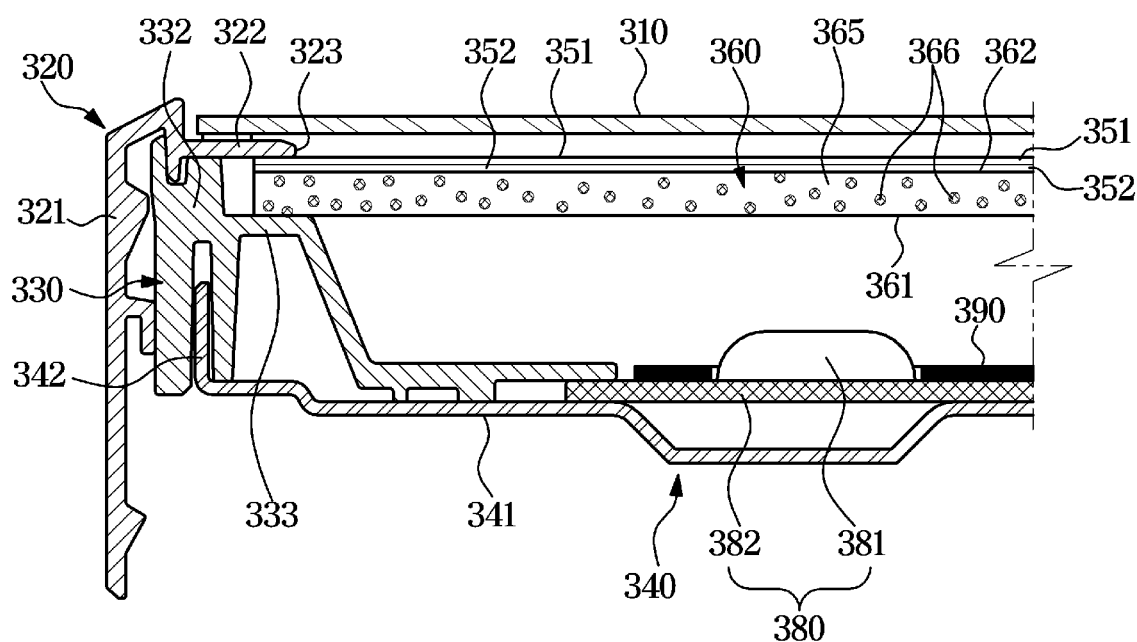
FIG. 12 is a side cross-sectional view of the display apparatus of FIG. 11.

FIG. 11 is an exploded perspective view showing main components of a display apparatus according to another embodiment of the disclosure. FIG. 12 is a side cross-sectional view of the display apparatus of FIG. 11.

The inventive concept of the disclosure may be applied to a diffuser plate of a direct type backlight unit, as well as a light guide plate of an edge type backlight unit as described above. Hereinafter, descriptions about the same components as those given in the above-described embodiments will be omitted.

Referring to FIGS. 11 and 12, a display apparatus 301 may include a liquid crystal panel 310 for displaying images, a backlight unit positioned behind the liquid crystal panel 310 to provide light to the liquid crystal panel 310, and a chassis assembly supporting the backlight unit and the liquid crystal panel 310.

The chassis assembly may include a rear chassis 340 supporting the backlight unit, a front chassis 320 positioned in front of the rear chassis 340 and supporting the liquid crystal panel 310, and a middle mold 330 coupled between the front chassis 320 and the rear chassis 340.

The backlight unit may be positioned behind the liquid crystal panel 310 to irradiate light toward the liquid crystal panel 310. The backlight unit may include a light source module 380 including a light source 381 and a substrate 382 on which the light source 381 is mounted, and a plurality of optical members positioned on a moving path of light emitted from the light source 381. The light source module 380 may be provided in a shape of a band (e.g., a rod), and a plurality of light source modules 380 may be arranged and spaced from each other.

A plurality of light sources 381 may be mounted in a line on the substrate 382. On the substrate 382, a driving power line may be formed to supply driving power to the light sources 381, and the driving power line may be connected to a signal cable (not shown) and a backlight unit driving circuit (not shown).

The optical members may be positioned on a moving path of light emitted from the light source 381 to guide a traveling direction of the light, diffuse the light, and/or improve optical properties.

The optical members may include a reflector sheet 390 for reflecting light to prevent optical loss, a diffuser plate 360 for uniformly diffusing non-uniform light emitted from the light source 381, and a plurality of optical sheets 351 and 352 for improving optical properties.

The reflector sheet 390 may reflect light emitted from the light source 381 or light traveling backward from the diffuser plate 360 toward the reflector sheet 390. The reflector sheet 390 may be positioned on the substrate 382. The reflector sheet 390 may be in close contact with the substrate 382. In the reflector sheet 390, a through hole may be formed to pass the light source 381.

The diffuser plate 360 may uniformly diffuse non-uniform light emitted from the light sources 381 and support the optical sheets 351 and 352. The diffuser plate 360 may uniformly diffuse light entered to the diffuser plate 360 through an incident surface 361 of the diffuser plate 360 and discharge the light through an exit surface 362 of the diffuser plate 360.

The rear chassis 340 may be positioned behind the backlight unit. The rear chassis 340 may have a plate shape of which edges are bent toward a front direction of the display apparatus 301. The backlight unit may be accommodated between the rear chassis 340 and the front chassis 320.

The rear chassis 340 may include a rear base 341 on which the light source module 380 is mounted, and a rear side portion 342 formed in one or more of an upper edge, a lower edge, a left edge, and a right edge of the rear chassis 340 to be coupled to the middle mold 330.

The front chassis 320 may be in a shape of a frame having an opening 323 to provide light from the backlight unit to the liquid crystal panel 310. The front chassis 320 may include a front side portion 321 formed in one or more of an upper edge, a lower edge, a left edge, and a right edge of the front chassis 320 to be coupled to the middle mold 330, and a panel support portion 322 protruding from the front side portion 321 inwardly of the display apparatus 301 to support the liquid crystal panel 310.

The middle mold 330 may support the diffuser plate 360 and maintain a space between the diffuser plate 360 and the light source module 380. The middle mold 330 may be coupled between the front chassis 320 and the rear chassis 340.

The middle mold 330 may include a frame portion 332 to which the front chassis 320 and the rear chassis 340 are coupled, and a diffuser plate support portion 333 protruding from the frame portion 332 inwardly of the display apparatus 301 to support the diffuser plate 360.

The diffuser plate 360 may have a shape of a hexahedron including the incident surface 361 and the exit surface 362.

The diffuser plate 360 may include a substrate 365 having transparency, and a plurality of quantum dot capsules 366 dispersed inside the substrate 365 to change a color of light emitted from the light source 381.

Each quantum dot capsule 366 may have the same or similar structure to that described in the above-described embodiments. The quantum dot capsules 366 may reflect, refract, and/or scatter light entered the inside of the diffuser plate 360 through the incident surface 361 and discharge the light toward the liquid crystal panel 310 through the exit surface 362.

The quantum dot capsules 366 may function to diffuse light, instead of beads provided in the inside of a general diffuser plate to diffuse light, as well as improve color reproduction.

According to the inventive concept of the disclosure, a display apparatus that achieves high brightness and high color reproduction by using a light-emitting function of quantum dots without using a quantum dot sheet may be provided.

Also, a display apparatus having reduced production and management costs based on integration of optical members may be provided.

Also, a display apparatus that does not require a pattern formation process for a light guide plate may be provided.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:
a liquid crystal panel configured to display an image;
a light guide plate configured to guide light toward the liquid crystal panel; and
a light source positioned adjacent to a side of the light guide plate,
wherein the light guide plate comprises a substrate having transparency, and a plurality of quantum dot capsules that are dispersed in the substrate,
wherein the substrate and the plurality of quantum dot capsules are integrated to form the light guide plate, by injecting the plurality of quantum dot capsules into a molten solution of the substrate that is extruded,
wherein the plurality of quantum dot capsules configured to change a color of light emitted from the light source, and the light source includes a first light source positioned adjacent to a first side of the light guide plate and a second light source positioned adjacent to a second side of the light guide plate, the second side being opposite to the first side,
wherein the light guide plate comprises a first surface, which faces the first light source and to which light emitted from the first light source is incident, a second surface which faces the second light source and to which light emitted from the second light source is incident, a third surface which faces the liquid crystal panel and through which light, which is incident from the light source, exits from the light guide plate, and a fourth surface being opposite to the third surface,
wherein a number of the plurality of quantum dot capsules per a unit volume is greater at a position toward a center portion of the light guide plate than at a position toward the first surface or the second surface,
wherein the fourth surface is flat and does not include any pattern for reflecting the light, which is incident from the light source,
wherein each of the plurality of quantum dot capsules includes a quantum dot resin being a mixture of a plurality of quantum dots and a cured material, and a protection layer coated on a surface of the quantum dot resin to surround the quantum dot resin, and
wherein the protection layer includes a polystyrene (PS) material.

2. The display apparatus according to claim 1, wherein the substrate includes a poly methyl methacrylate (PMMA) material.

3. The display apparatus according to claim 1, wherein the quantum dot resin comprises a first quantum dot configured to emit red light and a second quantum dot configured to emit green light.

4. The display apparatus according to claim 1, wherein the light source includes a blue light emitting diode (LED).

5. A light guide plate for a display apparatus, the light guide plate comprising:
a substrate having transparency;

a plurality of quantum dot capsules dispersed inside the substrate and configured to change a color of light emitted from a light source, wherein the substrate and the plurality of quantum dot capsules are integrated to form the light guide plate, by injecting the plurality of quantum dot capsules into a molten solution of the substrate that is extruded;

a first surface to which light emitted from a first light source is incident;

a second surface to which light emitted from a second light source is incident, the second surface being opposite to the first surface;

a third surface which faces a liquid crystal panel and through which light, which is incident from the light source, exits from the light guide plate; and a fourth surface being opposite to the third surface;

wherein a number of the plurality of quantum dot capsules per a unit volume is greater at a position toward a center portion of the light guide plate than at a position toward the first surface and the second surface, wherein the fourth surface is flat and does not include any pattern for reflecting the light, which is incident from the light source, wherein each of the plurality of quantum dot capsules includes a quantum dot resin being a mixture of a plurality of quantum dots and a cured material, and a protection layer coated on a surface of the quantum dot resin to surround the quantum dot resin, and wherein the protection layer includes a polystyrene (PS) material.

* * * * *